United States Patent Office 3,211,705
Patented Oct. 12, 1965

3,211,705
CATALYTIC MELT PREPARATION OF POLY-
AMIDES WITH MANGANOUS HYPOPHOS-
PHITE AS CATALYST
Filon A. Gadecki, Wilmington, Del., assignor to E. I. du
Pont de Nemours and Company, Wilmington, Del., a
corporation of Delaware
No Drawing. Filed Apr. 7, 1960, Ser. No. 20,544
6 Claims. (Cl. 260—78)

This invention relates to the preparation of synthetic linear polyamides and fibers. In particular, it relates to a catalytic melt polymerization process for preparing fiber-forming synthetic linear polyamides from a dicarboxylic acid and a weakly basic diamine, and to a novel polyamide product.

Polyamidation processes of diamines with dibasic acids are well known in the art and of considerable commercial significance. Among the processes known for polymerizing a diamine and a dicarboxylic acid to a high molecular weight linear polyamide, the melt polymerization process is usually preferred due to its simplicity and low cost. In the melt polymerization process essentially equivalent amounts of diamine and dicarboxylic acids may be dissolved separately in a solvent such as water and combined to form a salt solution. The solution of the salt may then be concentrated by evaporation of the solvent and the concentrated solution subjected to polymerizing conditions of elevated temperature and pressure. This melt polyamidation process for diamines and dicarboxylic acids usually results in a high molecular weight polyamide which can be melt spun into fibers.

However, when attempts are made to use the above process to prepare polyamides from a dicarboxylic acid and a weakly basic diamine, either no fiber-forming polymer is formed or the product obtained is of such low molecular weight that fibers spun therefrom are of very poor quality. For example, when a melt polyamidation is attempted of the weakly basic 4,6-dimethyl-metaphenylenediamine with sebacic acid by dissolving the reactants separately in water, combining the solutions and following the conventional process for melt polyamidation, no fiber-forming polymer is formed (in fact the diamine steam distills). When this melt polyamidation is modified and the dry diamine and dicarboxylic acid are mixed mechanically and subjected to polymerizing conditions of elevated temperature and pressure in the absence of catalyst, a product with an inherent viscosity (in metacresol) of 0.3 is obtained, which is at the threshold of fiber-forming properties. Similarly, when a melt polyamidation of metaphenylenediamine with adipic acid is attempted in the presence of water, no fiber-forming polymer is formed (in fact, the diamine steam distills). When the melt polymerization is conducted with the dry diamine and dry acid, a low molecular weight product is obtained with an inherent viscosity of 0.5 which, when spun, results in a fiber of very poor properties.

It is an object of this invention to provide an effective process for melt polymerizing a weakly basic diamine and a dicarboxylic acid. Another object is to prepare fiber-forming synthetic linear polyamides from weakly basic aromatic diamines such as phenylenediamines. A further object is to provide novel polyamide products from dimethyl metaphenylenediamine. Other objects will become apparent from the specification and claims.

In accordance with this invention, polyamides are prepared by melt polymerization of an anhydrous mixture of substantially equivalent proportions of a weakly basic diamine with a dicarboxylic acid and from 0.01 to 3.0% by weight of hypophosphite catalyst, based on the weight of the mixture. The dry ingredients may be mixed mechanically and then subjected to conventional melt polymerizing conditions at a temperature of at least 200° C.

Suitable polymerization procedures and reactants are described in U.S. 2,071,250, U.S. 2,071,253 and U.S. 2,278,878 and suitable spinning procedures are described in U.S. 2,571,975. The yarn can be cold drawn or hot drawn as desired, but cold drawing is preferred. A suitable cold drawing procedure is set forth in U.S. 2,289,232.

The useful hypophosphite catalysts are those represented by the general formula $M(H_2PO_2)_2$ wherein M is a divalent metal cation selected from the group consisting of manganese, calcium, strontium, barium, magnesium, zinc and cadmium cations, which are preferably used in an amount of 0.1 to 0.5% by weight of the mixture of diamine and dicarboxylic acid. Manganous hypophosphite is preferred.

The process is particularly useful in the preparation of fiber-forming linear polyamides from diamines represented by the general formula

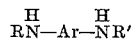

wherein Ar is an aromatic hydrocarbon nucleus of 6 to 20 carbon atoms, free of aliphatic unsaturation, having the amino groups directly attached to ring carbons of the aromatic nucleus at positions other than ortho to each other, and wherein R and R' are hydrogen or alkyl groups of 1 to 4 carbon atoms. Illustrations of such diamines are metaphenylenediamine, 4,6-dimethyl-metaphenylenediamine, bis(4-amino-3,5-dimethylphenyl)methane, and 1,5-naphthalenediamine.

The above are illustrations of weakly basic diamines which are defined herein as diamines having pK values of less than 5.5, where pK is the negative logarithm of the acid-dissociation constant of the first amino group, e.g., $$pK = -\log K$$

wherein $$K = \frac{(H_2N-Ar-NH_2)(H+)}{(H_2N-Ar-NH_3+)}$$

The pK values are measured by any of the various methods described by E. A. Braude and F. C. Nachod, "Determination of Organic Structures by Physical Methods," page 570 (Academic Press Inc., N.Y., 1955).

The invention is useful with all weakly basic diamines having pK values of less than 5.5. Additional illustrations of such diamines include those represented by the general formula

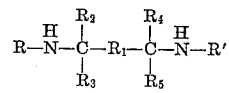

wherein $R_1$ is a divalent hydrocarbon of 2 to 10 carbon atoms and free from aliphatic unsaturation, and R, R', $R_2$, $R_3$, $R_4$ and $R_5$ are hydrogen or alkyl groups of 1 to 4 carbon atoms. A diamine of this type is 2,5-diamino-2,5-dimethylhexane. Weakly basic heterocyclic diamines include N,N'-diaminopyrazine.

In the following examples, which illustrate specific embodiments of the invention, parts are by weight:

Example I.—Preparation of poly(4,6-dimethyl-metaphenylene sebacamide)

27.2 parts of dry, pure 4,6-dimethyl-metaphenylenediamine (melting point 106.5 to 108° C., for preparation see E. Grevingk, Berichte 17, 2422–2431, 1884), 40.4 parts of dry, pure sebacic acid (melting point 133° C.) and 0.06 part of manganous hypophosphite (0.1% based on the weight of the reactants) are placed in an autoclave. The air is removed from the autoclave by purging with nitrogen after the pressure in the autoclave is reduced to 0.3 mm. The autoclave is heated to and maintained at 255° C. for 1½ hours, evacuated and heated at 285° C. for 1 hour.

The polymer so prepared has an inherent viscosity (in metacresol) of 0.81. The polymer is cut into flake, and melt spun from a screw melter at 310° C. The filaments are drawn over a hot pin (130° C.) at a draw ratio of 4.0 into an 80 total denier, 34 filament yarn bundle. The yarn shows improved wash and wear characteristics, as shown by the following test.

A wrinkle-free fabric made of the yarn is washed in a conventional automatic washing machine, spun dried in a conventional automatic spin drier, hung up for 2 hours and rated between 1 and 5 for degree of wrinkling by visual comparison with standards. A rating of 5 corresponds to a wrinkle-free fabric (perfect wash-wear performance) and a rating of 1 corresponds to a badly wrinkled fabric. The fabric made according to this example has a rating of 4.7 which compares to a rating of 1.5 for a fabric made of conventional 66 nylon yarn.

*Example II.—Preparation of poly(metaphenylene adipamide)*

30.6 parts of freshly distilled metaphenylenediamine M.P. 63° C.), 41.4 parts of dry, pure adipic acid (M.P. 151–53° C.) and 0.22 part of manganous hypophosphite (0.3% based on the weight of the reactants) are placed under nitrogen atmosphere in an autoclave. The air is removed from the autoclave by purging with nitrogen after the pressure in the autoclave is reduced to 0.3 mm. The autoclave is heated to and maintained at 210° C. for one hour, then heated to and maintained at 273° for ½ hour under nitrogen, evacuated and maintained at 273° an additional 1½ hours.

The polymer so prepared has an inherent viscosity (sulfuric acid) of 1.0. The polymer is cut into flake and melt-spun at 275° C. The filaments are drawn over a hot pin (50° C.) at a draw ratio of 2.0 into a 5-filament yarn bundle.

Since many different embodiments of the invention may be made without departing from the spirit and scope thereof, it is to be understood that the invention is not limited by the specific illustrations except to the extent defined in the following claims.

I claim:

1. In the process for preparing a synthetic linear polyamide by melt polymerization of a diamine with a dicarboxylic acid, the improvement for preparing a polyamide from a weakly basic diamine having a pK value of less than 5.5 which comprises melt polymerizing at a temperature of at least 200° C. an anhydrous mixture of substantially equivalent proportions of the weakly basic diamine with an aliphatic dicarboxylic acid and 0.01 to 3.0% by weight of manganous hypophosphite catalyst, based on the weight of the mixture.

2. A process as defined in claim 1 wherein the catalyst is present in an amount of 0.1 to 0.5% by weight of the mixture.

3. A process as defined in claim 1 wherein the weakly basic diamine is a diamine represented by the general formula

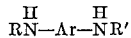

wherein Ar is an aromatic hydrocarbon nucleus of 6 to 20 carbon atoms, free of aliphatic unsaturation, having the amino groups directly attached to ring carbons of the aromatic nucleus at positions other than ortho to each other, and wherein R and R' are selected from the group consisting of hydrogen and alkyl groups of 1 to 4 carbon atoms.

4. A process as defined in claim 1 wherein the diamine is 4,6-dimethyl-metaphenylenediamine and the dicarboxylic acid is sebacic acid.

5. A process as defined in claim 1 wherein the diamine is metaphenylenediamine and the dicarboxylic acid is adipic acid.

6. In the preparation of polyamides, the steps of heating an anhydrous mixture of an aliphatic dicarboxylic acid and a metaphenylene diamine under polyamidation temperature and pressure conditions, said mixture also containing manganous hypophosphite catalyst.

References Cited by the Examiner

UNITED STATES PATENTS

| | | | |
|---|---|---|---|
| 2,244,192 | 6/41 | Flory | 260—78 |
| 2,557,808 | 6/51 | Walker | 260—78 |
| 2,564,001 | 8/51 | Genas | 260—78 |
| 2,927,841 | 3/60 | Ben | 260—78 |

FOREIGN PATENTS

| | | |
|---|---|---|
| 663,761 | 12/51 | Great Britain. |
| 793,132 | 4/58 | Great Britain. |

WILLIAM H. SHORT, *Primary Examiner.*

MILTON STERMAN, H. N. BURSTEIN, JOSEPH R. LIBERMAN, *Examiners.*